US011518409B2

(12) United States Patent
Wang et al.

(10) Patent No.: US 11,518,409 B2
(45) Date of Patent: Dec. 6, 2022

(54) SAFETY CONTROL METHOD AND SYSTEM BASED ON ENVIRONMENTAL RISK ASSESSMENT FOR INTELLIGENT CONNECTED VEHICLE

(71) Applicant: Tsinghua University, Beijing (CN)

(72) Inventors: Hong Wang, Beijing (CN); Wenhao Yu, Beijing (CN); Ziwen Duan, Beijing (CN); Jun Li, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 17/834,411

(22) Filed: Jun. 7, 2022

(65) Prior Publication Data

US 2022/0315055 A1     Oct. 6, 2022

Related U.S. Application Data

(63) Continuation of application No. 17/711,200, filed on Apr. 1, 2022, now abandoned.

(30) Foreign Application Priority Data

Apr. 2, 2021     (CN) .......................... 202110363690.7

(51) Int. Cl.
*B60W 60/00*     (2020.01)
*G06V 20/56*     (2022.01)
(Continued)

(52) U.S. Cl.
CPC ........ *B60W 60/0015* (2020.02); *B60W 30/16* (2013.01); *B60W 40/04* (2013.01);
(Continued)

(58) Field of Classification Search
USPC ............................................................ 701/23
See application file for complete search history.

(56) References Cited

U.S. PATENT DOCUMENTS 10,061,315 B2 *   8/2018   Yako ................... B60W 50/082
10,173,693 B2 *   1/2019   Barke ................. B60W 50/085
(Continued)

FOREIGN PATENT DOCUMENTS

CN        110009765 A       7/2019
CN        110488802 A      11/2019
(Continued)

OTHER PUBLICATIONS

First Office Action, CN Patent Application 202110363690.7, dated Dec. 29, 2021 (20 pages).

*Primary Examiner* — Jonathan M Dager
(74) *Attorney, Agent, or Firm* — Thomas | Horstemeyer, LLP (57) ABSTRACT

Embodiments of the present application disclose a safety control method and a safety control system based on environmental risk assessment for an intelligent connected vehicle. The method includes: when a vehicle is in an automatic driving mode, acquiring environmental parameter information of the vehicle in a current driving environment; determining a target driving control parameter which meets a preset safe driving condition under the current environmental parameter; and managing a current automatic driving level of the vehicle by using the target driving control parameter.

8 Claims, 3 Drawing Sheets

(51) Int. Cl.
*B60W 30/16* (2020.01)
*B60W 40/04* (2006.01)
*B60W 40/064* (2012.01)
*B60W 40/13* (2012.01)

(52) U.S. Cl.
CPC .......... *B60W 40/064* (2013.01); *B60W 40/13* (2013.01); *G06V 20/588* (2022.01); *B60W 2040/1307* (2013.01); *B60W 2420/42* (2013.01); *B60W 2510/0666* (2013.01); *B60W 2520/105* (2013.01); *B60W 2540/18* (2013.01); *B60W 2552/35* (2020.02); *B60W 2555/20* (2020.02)

(56) References Cited

U.S. PATENT DOCUMENTS

| | | | | |
|---|---|---|---|---|
| 10,496,090 B2* | 12/2019 | Latotzki | ............ | B60W 60/0053 |
| 10,589,738 B1* | 3/2020 | Boecker | ................ | B60W 10/18 |
| 10,663,965 B2* | 5/2020 | Yako | ................... | B60W 50/12 |
| 10,795,357 B2* | 10/2020 | Feng | .................... | G05D 1/0214 |
| 10,906,554 B2* | 2/2021 | Smid | ................... | G06V 20/597 |
| 10,913,464 B1* | 2/2021 | Qiao | .................... | B60W 50/14 |
| 10,994,741 B2* | 5/2021 | Zhou | ........................ | G06N 5/04 |
| 11,208,107 B2* | 12/2021 | Urano | ............. | B60W 30/18159 |
| 2016/0026182 A1* | 1/2016 | Boroditsky | .......... | G05D 1/0088 701/23 |
| 2016/0176408 A1* | 6/2016 | Lynch | ................. | B60W 40/068 701/23 |
| 2017/0277182 A1* | 9/2017 | May | .................... | B60W 50/082 |
| 2017/0329331 A1* | 11/2017 | Gao | ...................... | B60W 50/14 |
| 2019/0049958 A1* | 2/2019 | Liu | ........................ | G01S 17/00 |
| 2019/0138002 A1* | 5/2019 | Mimura | ................... | G08G 1/09 |
| 2019/0339694 A1* | 11/2019 | Akman | ................ | G05D 1/0061 |
| 2020/0064839 A1* | 2/2020 | Oyama | ................ | G05D 1/0088 |
| 2020/0189567 A1* | 6/2020 | Silver | ................ | B60W 60/001 |
| 2020/0216086 A1* | 7/2020 | Lenke | ................ | B60W 50/08 |
| 2020/0391756 A1* | 12/2020 | Wang | .................. | B60W 60/001 |
| 2021/0016805 A1* | 1/2021 | Oba | .......................... | G06T 3/00 |
| 2021/0086777 A1* | 3/2021 | Zhang | ................ | B60W 30/146 |
| 2022/0065656 A1* | 3/2022 | Young | ............... | B60W 60/0059 |
| 2022/0091807 A1* | 3/2022 | Yokoyama | ............ | B60K 35/00 |
| 2022/0194433 A1* | 6/2022 | Nagata | .................. | B60W 50/14 |
| 2022/0281456 A1* | 9/2022 | Giovanardi | ........... | B60W 40/06 |

FOREIGN PATENT DOCUMENTS

| | | |
|---|---|---|
| CN | 111376912 A | 7/2020 |
| CN | 111383474 A | 7/2020 |
| JP | 2020035100 A | 3/2020 |

* cited by examiner

SAFETY CONTROL METHOD AND SYSTEM BASED ON ENVIRONMENTAL RISK ASSESSMENT FOR INTELLIGENT CONNECTED VEHICLE

CROSS-REFERENCE TO RELATED APPLICATION

This application is a continuation of U.S. application of Ser. No. 17/711,200, filed Apr. 1, 2022, which claims priority of Chinese Patent Application No. 202110363690.7, filed to the CNIPA on Apr. 2, 2021, and entitled "Safety Control Method and System based on Environmental Risk Assessment for Intelligent Connected Vehicle", the contents disclosed in the applications mentioned above are hereby incorporated as a part of this application.

TECHNICAL FIELD

Embodiments of the present application relate to the field of automatic driving, particularly a safety control method and a safety control system based on environmental risk assessment for the intelligent connected vehicle.

BACKGROUND

With the development and popularization of automatic driving, the safety of autonomous vehicles has attracted people's attention. In related technologies, an automatic driving scheme that the safe speed of vehicles can be set based on the number of historical accidents on-road sections is proposed. Since historical accident data is challenging to count on a large scale and the safety index is not comprehensive, this scheme is not implemented. In addition, a safe driving control method for automatic vehicles based on current road state information and current traffic roadblock information is also proposed. Current weather information during driving, current sun azimuth information, and current time information are obtained from the current road state information. Still, if only such information is used for vehicle deceleration control, the operation action is too single, and vehicle safety that can be improved is limited.

SUMMARY

To solve any of the above technical problems, embodiments of the present application provide a safety control method and a safety control system based on environmental risk assessment for the intelligent connected vehicle.

To achieve the purpose of the embodiments of the present application, in an embodiment of the present application, a safety control method based on environmental risk assessment for the intelligent connected vehicles is provided, including:

when a vehicle is in the automatic driving mode, acquiring environmental parameter information of the vehicle in the current driving environment.

determining a target driving control parameter that meets a preset safe driving condition under the current environmental parameter; and managing a current automatic driving level of the vehicle by using the target driving control parameter.

A safety control system based on environmental risk assessment for the intelligent connected vehicles includes:

an acquisition module configured to acquire environmental parameter information of the vehicle in the current driving environment when the vehicle is in an automatic driving mode;

a determination module configured to determine a target driving control parameter that meets a preset safe driving condition under the current environmental parameter; and a management module configured to manage the current automatic driving level of the vehicle by using the target driving control parameter.

A storage medium with a computer program stored therein, wherein when being run, the computer program is configured to perform to the above-mentioned method.

An electronic device includes a memory and a processor where a computer program is stored in the memory, and the processor is configured to run the computer program to perform the above-mentioned method.

One of the above technical solutions has the following advantages or beneficial effects.

The driving control parameter in the current environmental condition which meets the safe driving condition is determined based on acquired environmental parameter information, the purpose of performing safety control on the intelligent connected vehicle based on a result of the environmental risk assessment is realized, and the safety of the vehicle in different risk environments is ensured.

Other features and advantages of embodiments of the present application will be set forth in the description below, and in part will become apparent from the description, or may be learned by practicing the embodiments of the present application. Purposes and other advantages of the technical solutions of the present application may be realized and acquired by structures specified in the specification, claims, and drawings.

BRIEF DESCRIPTION OF DRAWINGS

Accompanying drawings are used to provide a further understanding of technical solutions of the embodiments of the present application, form a part of the specification, and are used to explain the technical solutions of the embodiments of the present application together with the embodiments of the present application and are not intended to form limitations on the technical solutions of the embodiments of the present application.

DETAILED DESCRIPTION

In order to make purposes, technical solutions and advantages of the embodiments of the present application clearer, the embodiments of the present application will be described in detail below with reference to the accompanying drawings. It should be noted that the embodiments of the present application and the features in the embodiments can be combined with each other randomly if there is no conflict.

Figure 1:
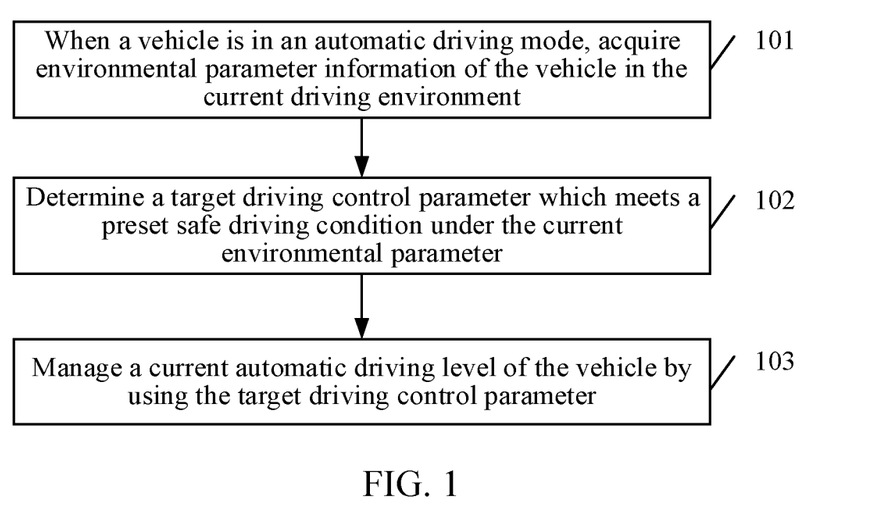
FIG. 1 is a flowchart of a safety control method based on environmental risk assessment for the intelligent connected vehicle according to an embodiment of the present application.

FIG. 1 is a flowchart of a safety control method based on environmental risk assessment for an intelligent connected vehicle according to an embodiment of the present application. As shown in FIG. 1, the method shown in FIG. 1 includes steps 101 to 103.

In step 101, when a vehicle is in an automatic driving mode, the environmental parameter information of the vehicle in a current driving environment is acquired.

In step 102, a target driving control parameter that meets a preset safe driving condition under the current environmental parameter is determined.

In step 103, a current automatic driving level of the vehicle is managed by using the target driving control parameter.

According to the method provided in the embodiment of the present application, a driving control parameter in the current environmental condition which meets the safe driving condition is determined based on the acquired environmental parameter information, a purpose of performing safety control on the intelligent connected vehicle based on a result of environmental risk assessment is realized, and safety of the vehicle in different risk environments is ensured.

The method according to the embodiment of the present application is described below.

In an exemplary embodiment, the target driving control parameters are obtained in the following mode, which includes:

prebuilding a corresponding relationship between each environmental parameter and a driving control parameter, wherein a determination mode of the driving control parameter in different value intervals of the same environmental parameter is recorded in each group of the corresponding relationships; and according to the corresponding relationships between the environmental parameters and the driving control parameters, determining a target driving control parameter corresponding to the environmental parameter information in the current driving environment.

Herein, forms of the pre-built corresponding relationships include, but are not limited to, functions, charts, and the like.

The target driving control parameter can be determined more quickly and effectively by using different value intervals in the corresponding relationships, and calculation costs are simplified.

In an exemplary embodiment, the environmental parameter information includes at least one of the following:

an external ambient temperature T of the vehicle, a weather condition W in a driving area, an adhesion coefficient F of a road surface ahead for driving, and a roughness R of a current road surface for driving;

the driving control parameter includes at least one of the following:

a maximum vehicle speed $v_{max}$, a maximum engine power $P_{max}$, a maximum steering wheel angle $\varphi_{max}$, a maximum engine torque $M_{max}$ and current minimum following distances $L_{min}$ in different traffic scenarios.

By acquiring an external ambient temperature, a current vehicle speed, a current weather condition, an adhesion coefficient, and a roughness of the current road surface, through a comprehensive optimization of all the above information, constraint information of the maximum vehicle speed, the maximum steering wheel angle, the maximum engine torque, the maximum engine power and the minimum following distance of the current vehicle is obtained, and finally, the constraint information is sent to a decision-maker to improve the safety of the vehicle in different risk environments.

In an exemplary embodiment, the environmental parameter information is obtained in the following mode, which includes:

using a temperature sensor installed outside the vehicle to acquire the ambient temperature T;

acquiring geographic position information L of the vehicle and requesting to acquire the weather condition W corresponding to the geographic position information L;

determining an adhesion coefficient F of a road surface ahead for driving by using image information I of the road surface in front of the vehicle collected by a camera installed inside the vehicle; and determining a roughness R of the current road surface by using an unsprung mass acceleration sensor installed on a kingpin of each wheel of the vehicle.

Figure 2:
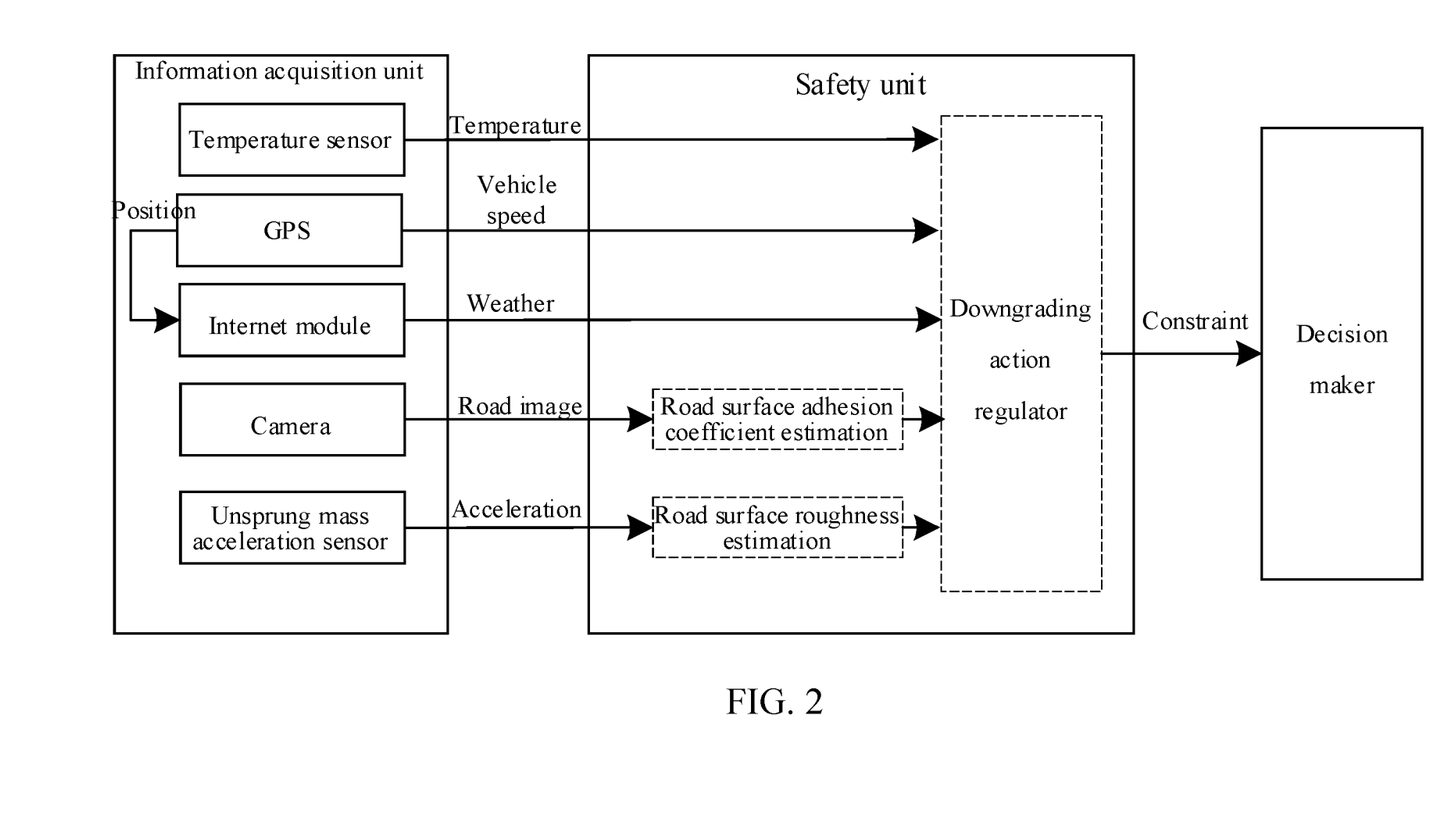
FIG. 2 is a schematic diagram of a safety control system based on environmental risk assessment for the intelligent connected vehicle according to an embodiment of the present application.

FIG. 2 is a schematic diagram of a safety control system based on environmental risk assessment for the intelligent connected vehicle according to an embodiment of the present application. As shown in FIG. 2, the shown system includes an information acquisition unit, a safety unit, and a decision-maker. The information acquisition unit includes a temperature sensor, a GPS module, an Internet module, a camera, and unsprung mass acceleration sensors. The safety unit includes three functional modules: a road surface adhesion coefficient estimation functional module, a road surface roughness estimation functional module, and a downgrading action regulator functional module.

The temperature sensor is installed outside the vehicle, collects the external ambient temperature T of the vehicle, and transmits the temperature to the safety unit.

The GPS module acquires geographic position information L of the vehicle and transmits the geographic position information to the Internet module, and simultaneously acquires a vehicle speed v and transmits the vehicle speed to the safety unit.

The Internet module acquires weather condition information W (rain, snow, visibility) of the current region from the cloud according to the geographic position information L of the vehicle and transmits the weather condition information to the safety unit.

The camera is installed at an upper position on the front windshield inside the vehicle, obtains image information I of the road surface in front of the vehicle, and transmits the image information to the safety unit.

The unsprung mass acceleration sensors are installed on a kingpin of each wheel of the vehicle and collect unsprung mass acceleration information $a_1, a_2, a_3, a_4$ of the vehicle and transmit the unsprung mass acceleration information to the safety unit.

The safety unit first estimates, according to the image information I of the road surface in front of the vehicle collected by the camera, an adhesion coefficient F of the road surface in front of the vehicle by using the road surface adhesion coefficient estimation functional module integrated with an existing road surface adhesion coefficient machine learning algorithm, estimate, according to the unsprung mass acceleration information $a_1, a_2, a_3, a_4$ collected by the unsprung mass acceleration sensors, a roughness R of the current road surface at the same time by using the road surface roughness estimation functional module integrated with an existing road surface roughness estimation method, and transmit the adhesion coefficient F of the road surface in front of the vehicle and the roughness R of the current road surface to the downgrading action regulator functional module. According to the ambient temperature T, the weather condition W, the adhesion coefficient F of the road surface, the roughness R of the road surface, the downgrading action regulator functional module calculates, based on a rule-based method, five constraint conditions for vehicle safety driving including a maximum vehicle speed $v_{lmax}$, a maximum steering wheel angle $\varphi_{lmax}$, a maximum engine torque $M_{lmax}$, a maximum engine power $P_{lmax}$ and a minimum following distance $L_{lmin}$, and the above constraint conditions are sent to the decision-maker.

After receiving the constraint conditions from the downgrading action regulator, the decision-maker makes a decision based on the constraint conditions according to an existing decision algorithm.

Driving of the vehicle is directly constrained by contents of environmental perception, compared with other methods for improving vehicle safety, this method has fewer intermediate links and quick response and promotes driving safety by constraining rather than directly interfering with the vehicle's behaviors, which can not only improve the driving safety of vehicles in various unfavorable environments, but also exert the initiative of lower-level decision-makers, and the system is more flexible and balanced.

In an exemplary embodiment, a maximum vehicle speed $v_{T\_max}$ and a maximum engine power $P_{T\_max}$ under a constraint of the ambient temperature T are determined;

a maximum vehicle speed $v_{W\_max}$ and a minimum following distance $L_{W\_min}$ under a constraint of the weather condition W are determined;

a maximum steering wheel angle $\varphi_{F\_max}$, a maximum engine torque $M_{F\_max}$ and a minimum following distance $L_{F\_min}$ under a constraint of the adhesion coefficient F of the road surface ahead for driving are determined; and a maximum vehicle speed $v_{R\_max}$ under a constraint of the roughness R of the road surface on which the vehicle travels is determined.

It can be seen from the above that at least two driving control parameters can be determined by the same environmental parameter, that is, the same environmental parameter can affect the values of at least two driving control parameters. Therefore, the determination by the above method can make determined target driving control parameters more accurate.

In an exemplary embodiment, target driving control parameters are determined in a following mode, which includes:

$v_{max} = \min\{v_{T\_max}, v_{W\_max}, v_{F\_max}, v_{R\_max}\}$;

$\varphi_{max} = \varphi_{F\_max}$;

$M_{max} = M_{F\_max}$;

$P_{max} = P_{T\_max}$;

$L_{min} = \max\{L_{W\_min}, L_{F\_min}\}$.

After the target driving control parameters are obtained based on different environmental parameters, the obtained determination results are synthesized to obtain the target driving control parameters for controlling automatic driving, which are used as reference data for adjusting an automatic driving level.

In an exemplary embodiment, the weather condition W includes at least two dimensions which are selected from rain, snow, and visibility;

when the maximum vehicle speed $v_{W\_max}$ and the minimum vehicle following distance $L_{W\_min}$ are determined according to the weather condition W, the maximum vehicle speed $v_{W\_max}$ and the minimum vehicle following distance $L_{W\_min}$ corresponding to each dimension in the weather condition are determined.

By acquiring values of driving control parameters in different dimensions, the values of the driving control parameters can be determined more accurately and the accuracy of data can be improved.

The method according to the embodiments of the present application is described below with an application example:

as shown in FIG. 2, the system includes an information acquisition unit, a safety unit, and a decision-maker. The information acquisition unit includes a temperature sensor, a GPS module, an Internet module, a camera, and an acceleration sensor. The safety unit includes three functional modules: a road surface adhesion coefficient estimation functional module, a road surface roughness estimation functional module, and a downgrading action regulator functional module.

Take a two-axle four-wheel vehicle with the L3 automatic driving function as an example, wherein 1, 2, 3, and 4 respectively represent the front-left, front-right, rear-left, and rear-right corners of the vehicle.

The temperature sensor is installed on the top of the vehicle (as remote from heating sources as possible), which converts temperature information of the external environment into a digital signal T and sends the digital signal T to the safety unit.

The GPS module is installed on the vehicle's chassis, acquires the real-time geographic position information of the vehicle, converts the geographic position information into a digital signal L, and sends the digital signal L to the Internet module. At the same time, the GPS module also collects current vehicle speed information of the vehicle, converts the vehicle speed information into a digital signal v, and sends the digital signal v to the safety unit.

The Internet module is installed inside the vehicle, with the received GPS signal, acquires weather information of the position where the vehicle is located from the cloud, converts the weather information into a digital signal W, and sends the digital signal W to the safety unit.

The camera is installed right above the front windshield vehicle, acquires image information I of the road surface in front of the vehicle, and sends the image information I to the safety unit.

The unsprung mass acceleration sensors are respectively installed on a kingpin of each wheel of the vehicle and collect unsprung mass acceleration information $a_1$, $a_2$, $a_3$, $a_4$ of the vehicle and send the unsprung mass acceleration information to the safety unit.

After the safety unit receives the information transmitted by each module in the information acquisition unit, three functional modules, namely, the road surface adhesion coefficient estimation functional module, the road surface roughness estimation functional module, and the downgrading action regulator functional module are used for performing information processing to finally generate five vehicle safe driving constraint conditions, namely, a maximum vehicle speed $v_{lmax}$, a maximum steering wheel angle $\varphi_{lmax}$, a maximum engine torque $M_{lmax}$, a maximum engine power $P_{lmax}$ and a minimum following distance $L_{lmin}$, are generated, and sends the above constraint conditions to the decision-maker.

The road surface adhesion coefficient estimation functional module receives the image information I of the road surface in front of the vehicle sent by the camera to the safety unit, uses a method in the article "Neural Network-based road friction using road weather information" written by Minges Florian of Chalmers University of Technology in Sweden in 2020 to estimate the adhesion coefficient F of the road surface in front of the vehicle through the image information I of the road surface in front of the vehicle, and sends the adhesion coefficient F to the functional module of the downgrading action regulator.

The road surface roughness estimation module receives the vehicle unsprung mass acceleration information $a_1$, $a_2$, $a_3$, $a_4$ sent by the unsprung mass acceleration sensors to the safety unit, uses the method in the article "Online classification of road roughness conditions with vehicle unsprung mass acceleration by sliding time window" published by Yu Wenhao of Jiangsu University in China in 2018 through the vehicle unsprung mass acceleration information $a_1$, $a_2$, $a_3$, $a_4$ to estimate the roughness R of the current road surface of the vehicle and sends the roughness to the downgrading action regulator functional module.

The downgrading action regulator receives the external ambient temperature T, the current vehicle speed v, and the current weather condition W sent to the safety unit by the temperature sensor, the GPS module, and the Internet module, and the adhesion coefficient F of the road surface in front of the vehicle and the roughness R of the current road surface which are sent by the road surface adhesion coefficient estimation functional module. According to the safety requirements, five constraint conditions for vehicle safety driving, namely the maximum vehicle speed $v_{lmax}$, the maximum steering wheel angle $\varphi_{lmax}$, the maximum engine torque $M_{lmax}$, the maximum engine power $P_{lmax}$ and the minimum following distance $L_{lmin}$, are calculated according to established mapping rules, and the above constraint conditions are sent to the decision-maker.

The constraint condition of the maximum vehicle speed $v_{lmax}$ is calculated by using the external ambient temperature T, the current weather condition W, the adhesion coefficient F of the road surface in front of the vehicle, and the roughness R of the current road surface of the vehicle. The constraint condition of the maximum steering wheel angle $\varphi_{lmax}$ is calculated by using the adhesion coefficient F of the road surface in front of the vehicle. The constraint condition of the maximum engine torque $M_{lmax}$ is calculated by using the adhesion coefficient F of the road surface in front of the vehicle. The constraint condition of the maximum engine power $P_{lmax}$ is calculated by the external ambient temperature T. The constraint condition of the minimum following distance $L_{lmin}$ is calculated by using the current weather condition W.

Figure 3:
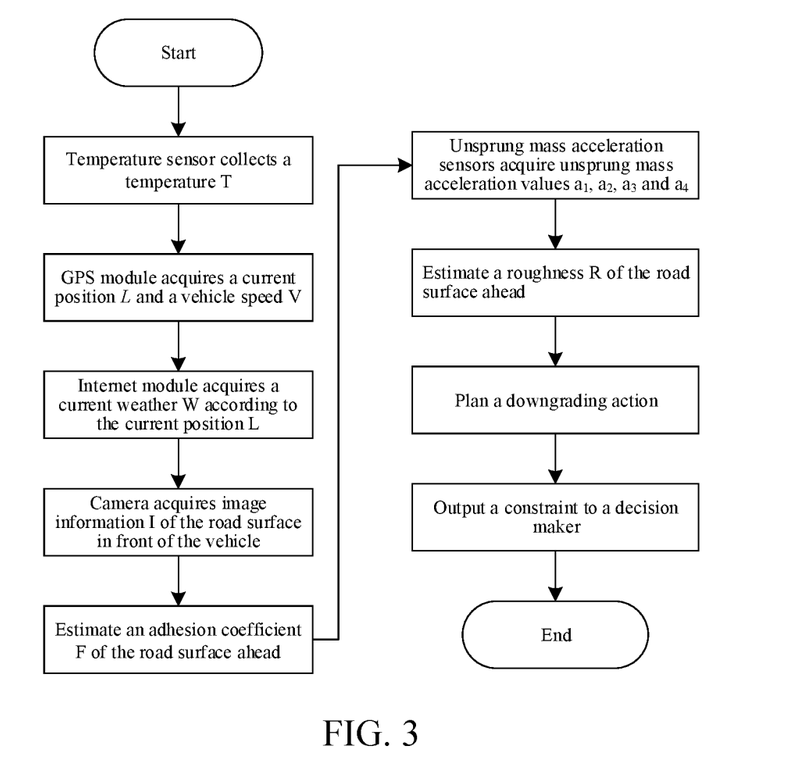
FIG. 3 is a flowchart of a method for driving control using the system shown in FIG. 2.

FIG. 3 is a flowchart of a method for driving control using the system shown in FIG. 2. As shown in FIG. 3, the method includes steps 1 to 9.

In step 1, a temperature sensor collects an external ambient temperature T of a vehicle and sends the external ambient temperature to the safety unit.

In step 2, a GPS module acquires a current position L of the vehicle and sends the current position to an Internet module. At the same time, the GPS module acquires a current vehicle speed v of the vehicle and sends the current vehicle speed to the safety unit.

In step 3, the Internet module acquires weather information W of the current position according to the current position L of the vehicle and sends the weather information to the safety unit.

In step 4, a camera collects image information I of a road surface in front of the vehicle and sends the image information to the safety unit.

In step 5, in the safety unit, based on the image information I of the road surface in front of the vehicle, a road surface adhesion coefficient estimation functional module uses a method in the article "Neural network-based road friction using road weather information" by Minges Florian of Chalmers University of Technology in Sweden in 2020 to estimate the adhesion coefficient F of the road surface in front of the vehicle and sends the adhesion coefficient to a degraded action regulator functional module.

In step 6, unsprung mass acceleration sensors collect unsprung mass acceleration information $a_1$, $a_2$, $a_3$, $a_4$ of the vehicle and send the unsprung mass acceleration information to the safety unit.

In step 7, in the safety unit, based on the vehicle unsprung mass acceleration information $a_1$, $a_2$, $a_3$, $a_4$, a road surface roughness estimation functional module uses a method in the article "Online classification of road roughness conditions with vehicle unsprung mass acceleration by sliding time window" by Yu Wenhao of Jiangsu University in China in 2018 to estimate the roughness R of the current road surface of the vehicle and sends the roughness to a downgrading action regulator functional module.

In step 8, in the safety unit, the downgrading action regulator functional module receives the external ambient temperature T, the current vehicle speed v, the current weather condition W sent to the safety unit by the temperature sensor, the GPS module and the Internet module, the adhesion coefficient F of the road surface in front of the vehicle sent by the road surface adhesion coefficient estimation functional module and the roughness R of the current road surface sent by the road surface roughness estimation functional module. According to the safety requirements, five constraint conditions for vehicle safety driving, namely the maximum vehicle speed $v_{lmax}$, the maximum steering wheel angle $\varphi_{lmax}$, the maximum engine torque $M_{lmax}$, the maximum engine power $P_{lmax}$ and the minimum following distance $L_{lmin}$, are calculated according to established mapping rules.

Forms of the mapping rules include but are not limited to, functions, charts, and the like. Taking the form of function as an example, the downgrading action regulator gives constraint conditions for vehicle safe driving according to the following flow. For any vehicle, there must be five types of basic information, namely, a maximum vehicle speed $v_{max}$, a maximum engine power $P_{max}$, a maximum steering wheel angle $\varphi_{max}$, a maximum engine torque $M_{max}$ and current minimum following distances $L_{min}$ in different traffic scenarios. Based on the five types of basic information, firstly, (1) the downgrading action regulator calculates a constraint condition of a maximum vehicle speed $v_{T\_max}$ (m/s) limited by temperature and a constraint condition of maximum engine power $P_{T\_max}$ (watt) limited by temperature according to the external ambient temperature T sent by the temperature sensor based on the following equations respectively:

$$v_{T\_max} = \begin{cases} v_{max} + 2(T+10) & T \le -10 \\ v_{max} & -10 < T < 30 \\ v_{max} - 2(T-30) & T > 30 \end{cases}$$

$$P_{T\_max} = \begin{cases} 0.8 P_{max} & T \le -10 \\ P_{max} & -10 < T < 30 \\ 0.9 P_{max} & T > 30 \end{cases}$$

wherein relationships between the constraint condition of the maximum vehicle speed $v_{T\_max}$ limited by temperature the maximum engine power $P_{T\_max}$ limited by temperature and the ambient temperature T include, but are not limited to, the relationships described by the above-mentioned equations.

(2) The downgrading action regulator calculates, according to the current weather condition W sent by the Internet module, a constraint condition of a maximum vehicle speed $v_{W\_i\_max}$ (m/s) limited by weather and a constraint condition of a minimum following distance $L_{W\_i\_min}$ (m) limited by weather. The weather W includes three types: rain, snow, and visibility, which are expressed as $$W=[r,s,f]^T$$

wherein r represents rainfall (mm/12 hours), s represents snowfall (mm/12 hours), f represents visibility (m), and in $v_{W\_i\_max}$ and $L_{W\_i\_min}$, i∈W. Then the constraint condition of the maximum speed $v_{W\_i\_max}$ limited by weather corresponding to different types of weather environments is:

$$v_{W\_r\_max} = \begin{cases} v_{max} & r \leq 5 \\ 0.95v_{max} & 5 < r < 15 \\ 0.9v_{max} & 15 < r < 50 \\ 0.8v_{max} & r > 50 \end{cases}$$

$$v_{W\_s\_max} = \begin{cases} 0.95v_{max} & s \leq 1 \\ 0.9v_{max} & 1 < s < 3 \\ 0.85v_{max} & 3 < s < 6 \\ 0.8v_{max} & s > 6 \end{cases}$$

$$v_{W\_f\_max} = \begin{cases} 20 & f \leq 50 \\ 40 & 50 < f < 100 \\ 60 & 100 \leq f < 200 \\ 80 & 200 \leq f \leq 500 \end{cases}$$

The constraint condition of the minimum following distance $L_{W\_i\_min}$ limited by weather corresponding to different types of weather environments is:

$$L_{W\_r\_min} = \begin{cases} L_{min} & r \leq 5 \\ 1.1L_{min} & 5 < r < 15 \\ 1.3L_{min} & 15 < r < 50 \\ 1.5L_{min} & r > 50 \end{cases}$$

$$L_{W\_s\_min} = \begin{cases} L_{min} & s \leq 1 \\ 1.2L_{min} & 1 < s < 3 \\ 1.4L_{min} & 3 < s < 6 \\ 1.6L_{min} & s > 6 \end{cases}$$

$$L_{W\_f\_min} = \begin{cases} 50 & f \leq 100 \\ 100 & 100 < f < 200 \\ 150 & f \geq 500 \end{cases}$$

wherein relationships between the constraint condition of the maximum vehicle speed $v_{W\_i\_max}$ limited by weather, the constraint condition of the minimum following distance $L_{W\_i\_min}$ limited by weather and the current weather condition W include, but are not limited to, the relationships described by the above-mentioned equations.

(3) According to the following equations, the downgrading action regulator calculates, according to the adhesion coefficient F of the road surface in front of the vehicle sent by the road surface adhesion coefficient estimation functional module, a constraint condition of a maximum vehicle speed $v_{F\_max}$ limited by the adhesion coefficient of the road surface in front of the vehicle, a constraint condition of a maximum steering wheel angle $\varphi_{F\_max}$ limited by the adhesion coefficient of the road surface in front of the vehicle, a constraint condition of a maximum engine torque $M_{F\_max}$ limited by the adhesion coefficient of the road surface in front of the vehicle and a constraint condition of a minimum following distance $L_{F\_min}$ limited by the adhesion coefficient of the road surface in front of the vehicle:

$$v_{F\_max} = \frac{1}{2}(1+2F)v_{max}$$

$$\varphi_{F\_max} = 10\sin^{-1}\left(\frac{Fgl}{v}\right)$$

$$M_{F\_max} = \frac{1}{3}(1+2F)M_{max}$$

$$L_{F\_min} = \begin{cases} 1.8L_{min} & F \leq 0.2 \\ 1.6L_{min} & 0.2 < F < 0.4 \\ 1.4L_{min} & 0.4 \leq F < 0.6 \\ 1.2L_{min} & 0.6 \leq F < 0.8 \\ L_{min} & 0.8 \leq F < 1.0 \end{cases}$$

wherein v is a current vehicle speed sent by the GPS module, g is the gravity acceleration value, and l is the wheelbase of the vehicle. The relationships between the constraint condition of the maximum vehicle speed $v_{F\_max}$ limited by the adhesion coefficient of the road surface in front of the vehicle, the constraint condition of the maximum steering wheel angle $\varphi_{F\_max}$ limited by the adhesion coefficient of the road surface in front of the vehicle, the constraint condition of the maximum engine torque $M_{F\_max}$ limited by the adhesion coefficient of the road surface in front of the vehicle and the constraint condition of the minimum following distance $L_{F\_min}$ limited by the adhesion coefficient of the road surface in front of the vehicle, and the adhesion coefficient F of the road surface in front of the vehicle include, but not limited to, the relationships described by the above-mentioned equations.

(4) According to the roughness R of the current road surface of the vehicle sent by the road surface roughness estimation functional module, the downgrading action regulator calculates a constraint condition of a maximum speed $v_{R\_max}$ limited by the roughness of the current road surface of the vehicle according to the following equation:

$$v_{R\_max}=v_{max}-2\log_2(R)$$

wherein a relationship between the constraint condition of the maximum vehicle speed $v_{R\_max}$ limited by the roughness of the current road surface of the vehicle and the roughness R of the current road surface of the vehicle includes, but is not limited to, the relationship described by the above-mentioned equation.

(5) The downgrading action regulator calculates, according to the following equations, five final constraint conditions for vehicle safety driving, namely, the maximum vehicle speed $v_{lmax}$, the maximum steering wheel angle $\varphi_{lmax}$, the maximum engine torque $M_{lmax}$, the maximum engine power $P_{lmax}$ and the minimum following distance $L_{lmin}$, and sends them to the decision maker:

$$v_{lmax}=\min\{v_{T\_max},v_{W\_r\_max},v_{W\_s\_max},v_{W\_f\_max},v_{F\_max},v_{R\_max}\}$$

$$\varphi_{lmax}=\varphi_{F\_max}$$

$$M_{lmax}=M_{F\_max}$$

$$P_{lmax}=P_{T\_max}$$

$$L_{lmin}=\max\{L_{W\_r\_min},L_{W\_s\_min},L_{W\_f\_min},L_{F\_min}\}$$

In step 9, the decision maker makes corresponding downgrading actions according to an existing planning method through the constraint conditions output by the downgrading action regulator, so as to minimize the risk of the vehicle in the current environment.

According to the method provided in the embodiments of the present application, a safety control scheme based on environmental risk assessment for an intelligent connected vehicle is provided. In this scheme, the external ambient temperature, the current vehicle speed, the current weather condition, the road image ahead and the unsprung mass acceleration of the vehicle are acquired respectively by the temperature sensor, the GPS module, the Internet module, the camera and the unsprung mass acceleration sensors. The adhesion coefficient and the roughness of the current road surface are estimated by using existing road surface adhesion coefficient and road surface roughness estimation methods, finally the downgrading action regulator optimizes all the above information comprehensively to obtain the constraint information of the maximum vehicle speed, the constraint information of the maximum steering wheel angle, the constraint information of the maximum engine torque, the constraint information of the maximum engine power and the constraint information of the minimum following distance, and finally sends the constraint information to the decision maker to improve the safety of the vehicle in different risk environments.

Figure 4:
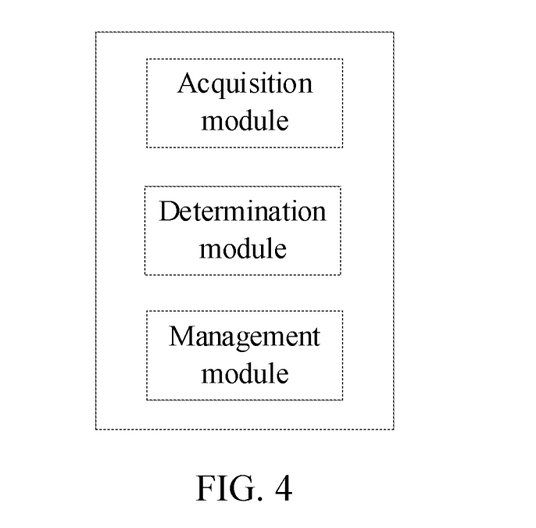
FIG. 4 is a structural diagram of a safety control system based on environmental risk assessment for the intelligent connected vehicle according to an embodiment of the present application.

FIG. 4 is a structural diagram of a safety control system based on environmental risk assessment for intelligent connected vehicle according to an embodiment of the present application. Referring to FIG. 4, the system includes:

an acquisition module configured to acquire environmental parameter information of a vehicle in a current driving environment when a vehicle is in an automatic driving mode;

a determination module configured to determine a target driving control parameter which meets a preset safe driving condition under the current environmental parameter; and a management module configured to manage a current automatic driving level of the vehicle by using the target driving control parameter.

According to the method provided in the embodiment of the present application, the driving control parameter in the current environmental condition which meets the safe driving condition is determined based on acquired environmental parameter information, the purpose of performing safety control on the intelligent connected vehicle based on a result of the environmental risk assessment is realized, and safety of the vehicle in different risk environments is ensured.

In an embodiment of the present application, a storage medium with a computer program stored therein is provided, wherein when being run, the computer program is configured to perform to any one of above-mentioned methods.

In an embodiment of the present application, an electronic device including a memory and a processor is provided, a computer program is stored in the memory, and the processor is configured to run the computer program to perform any one of the above-mentioned methods.

It can be understood by those of ordinary skills in the art that all or some steps in the method disclosed above and functional modules/units in the system and the apparatus may be implemented as software, firmware, hardware, and proper combinations thereof. In a hardware implementation mode, division of the functional modules/units mentioned in the above description is not necessarily a division corresponding to physical components. For example, a physical component may have multiple functions, or multiple physical components may cooperate to execute a function or a step. Some components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skills in the art, the term computer storage medium includes volatile and nonvolatile and removable and irremovable media implemented in any method or technology for storing information (for example, a computer-readable instruction, a data structure, a program module, or other data). The computer storage medium includes, but not limited to, a random access memory (RAM), a read only memory (ROM), an Electrically Erasable Programmable Read-Only Memory (EEPROM), a flash memory or other memory technologies, a CD-ROM, a Digital Video Disk (DVD) or other compact discs, a cassette, a magnetic tape, a disk memory or other magnetic storage devices, or any other medium configurable to store expected information and accessible for a computer. In addition, it is known to those of ordinary skills in the art that the communication medium usually includes a computer-readable instruction, a data structure, a program module, or other data in a modulated data signal of, such as, a carrier or another transmission mechanism, and may include any information transmission medium.

The invention claimed is:

1. A safety control method based on environmental risk assessment for an intelligent connected vehicle, comprising:
acquiring environmental parameter information of a vehicle in a current driving environment when the vehicle is in an automatic driving mode;
determining a target driving control parameter which meets a preset safe driving condition under the current environmental parameter; and
managing a current automatic driving level of the vehicle by using the target driving control parameter;
wherein the environmental parameter information comprises at least one of the following:
an external ambient temperature T of the vehicle, a weather condition W in a driving area, an adhesion coefficient F of a road surface ahead for driving and a roughness R of a current road surface for driving;
the driving control parameter comprises at least one of the following:
a maximum vehicle speed $v_{max}$, a maximum engine power $P_{max}$, a maximum steering wheel angle $\varphi_{max}$, a maximum engine torque $M_{max}$ and a current minimum following distance $L_{min}$ in different traffic scenarios;
wherein the environmental parameter information is obtained by:
using a temperature sensor installed outside the vehicle to acquire the external ambient temperature T;
acquiring geographic position information L of the vehicle and requesting to acquire the weather condition W corresponding to the geographic position information L;
determining the adhesion coefficient F of the road surface in front of the vehicle by using image information I of the road surface in front of the vehicle collected by a camera installed inside the vehicle; and
determining the roughness R of the current road surface by using an unsprung mass acceleration sensor installed on a kingpin of each wheel of the vehicle.

2. The method according to claim 1, wherein the target driving control parameter is obtained by:
pre-building a corresponding relationship between each environmental parameter and a driving control parameter, wherein a determination mode of a driving control parameter for a same environmental parameter in different value intervals is recorded in each group of the corresponding relationships; and
according to the corresponding relationships between the environmental parameters and the driving control parameters, determining the target driving control parameter corresponding to the environmental parameter information in the current driving environment.

3. The method according to claim 1, comprising:
determining a maximum vehicle speed $v_{T\_max}$ and a maximum engine power $P_{T\_max}$ under a constraint of the external ambient temperature T;
determining a maximum vehicle speed $v_{W\_max}$ and a minimum following distance $L_{W\_min}$ under a constraint of the weather condition W;
determining a maximum steering wheel angle $\varphi_{F\_max}$, a maximum engine torque $M_{F\_max}$ and a minimum following distance $L_{F\_min}$ under a constraint of the adhesion coefficient F of the road surface ahead for driving; and
determining a maximum vehicle speed $v_{R\_max}$ under a constraint of the roughness R of the road surface on which the vehicle travels.

4. The method according to claim 3, wherein the target driving control parameter is determined in the following manner:

$$v_{max} = \min\{v_{T\_max}, v_{W\_max}, v_{F\_max}, v_{R\_max}\};$$

$$\varphi_{max} = \varphi_{F\_max};$$

$$M_{max} = M_{F\_max};$$

$$P_{max} = P_{T\_max};$$

$$L_{min} = \max\{L_{W\_min}, L_{F\_min}\}.$$

5. The method according to claim 3, wherein:
the weather condition W comprises at least two dimensions which are selected from rain, snow and visibility;
when the maximum vehicle speed $v_{W\_max}$ and the minimum vehicle following distance $L_{W\_min}$ are determined according to the weather condition W, the maximum vehicle speed $v_{W\_max}$ and the minimum vehicle following distance $L_{W\_min}$ corresponding to each dimension in the weather condition are determined.

6. A safety control system based on environmental risk assessment for an intelligent connected vehicle, comprising:
an acquisition module configured to acquire environmental parameter information of a vehicle in a current driving environment when the vehicle is in an automatic driving mode;
a determination module configured to determine a target driving control parameter which meets a preset safe driving condition under the current environmental parameter; and
a management module configured to manage a current automatic driving level of the vehicle by using the target driving control parameter;
wherein the environmental parameter information comprises at least one of the following:
an external ambient temperature T of the vehicle, a weather condition W in a driving area, an adhesion coefficient F of a road surface ahead for driving and a roughness R of a current road surface for driving;
the driving control parameter comprises at least one of the following:
a maximum vehicle speed $v_{max}$, a maximum engine power $P_{max}$, a maximum steering wheel angle $\varphi_{max}$, a maximum engine torque $M_{max}$ and a current minimum following distance $L_{min}$ in different traffic scenarios;
wherein the environmental parameter information is obtained by:
using a temperature sensor installed outside the vehicle to acquire the external ambient temperature T;
acquiring geographic position information L of the vehicle and requesting to acquire the weather condition W corresponding to the geographic position information L;
determining the adhesion coefficient F of the road surface in front of the vehicle by using image information I of the road surface in front of the vehicle collected by a camera installed inside the vehicle; and
determining the roughness R of the current road surface by using an unsprung mass acceleration sensor installed on a kingpin of each wheel of the vehicle.

7. A non-transitory storage medium in which a computer program is stored, wherein when being run, the computer program is configured to perform the method according to claim 1.

8. An electronic device comprising a memory and a processor, wherein a computer program is stored in the memory, and the processor is configured to run the computer program to perform the method according to claim 1.

* * * * *